US012412739B2

(12) United States Patent
Baba et al.

(10) Patent No.: US 12,412,739 B2
(45) Date of Patent: Sep. 9, 2025

(54) CHARGE REDUCED MASS SPECTROMETRY FOR SEQUENCING OF OLIGONUCLEOTIDE THERAPEUTICS

(71) Applicant: DH Technologies Development Pte. Ltd., Singapore (SG)

(72) Inventors: Takashi Baba, Richmond Hill (CA); Kaoru Karasawa, Tokyo (JP)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 347 days.

(21) Appl. No.: 18/016,162

(22) PCT Filed: Jul. 12, 2021

(86) PCT No.: PCT/IB2021/056258
§ 371 (c)(1),
(2) Date: Jan. 13, 2023

(87) PCT Pub. No.: WO2022/013716
PCT Pub. Date: Jan. 20, 2022

(65) Prior Publication Data

US 2023/0343570 A1 Oct. 26, 2023

Related U.S. Application Data

(60) Provisional application No. 63/051,686, filed on Jul. 14, 2020.

(51) Int. Cl.
*H01J 49/00* (2006.01)
*H01J 49/06* (2006.01)

(52) U.S. Cl.
CPC ........ *H01J 49/0045* (2013.01); *H01J 49/062* (2013.01)

(58) Field of Classification Search
USPC .................................................. 250/281, 282
See application file for complete search history.

(56) References Cited

U.S. PATENT DOCUMENTS

2004/0089802 A1 5/2004 Kato
2006/0255261 A1* 11/2006 Whitehouse .......... H01J 49/165 250/288

(Continued)

FOREIGN PATENT DOCUMENTS

WO 2020044159 A1 3/2020

OTHER PUBLICATIONS

Bahrani Hirbod et al, "Preferential accumulation of glycosylated cyanidins in winter-hardy rye (*Secale cereale*L.) genotypes during cold acclimation", Environmental and Experimental Botany, (May 20, 2019), vol. 164, doi:10.1016/J.ENVEXPBOT.2019.05.006, ISSN 0098-8472, pp. 203-212, XP085707306.

(Continued)

*Primary Examiner* — Kiet T Nguyen
(74) *Attorney, Agent, or Firm* — Potomac Law Group, PLLC; Reza Mollaaghababa; Brian Hairston

(57) ABSTRACT

In one aspect, a method of performing mass spectrometry is disclosed, which comprises ionizing a plurality of oligonucleotides to generate a plurality of negatively charged oligonucleotide ions, and interacting a plurality of charged reagent ions with the negatively charged oligonucleotide ions to reduce the negative charge state of the negatively charged oligonucleotide ions.

20 Claims, 8 Drawing Sheets

(56) References Cited

U.S. PATENT DOCUMENTS

| | | | | |
|---|---|---|---|---|
| 2016/0126076 | A1* | 5/2016 | Baba | H01J 49/0072 250/489 |
| 2021/0257200 | A1* | 8/2021 | Baba | H01J 49/0031 |
| 2021/0272787 | A1* | 9/2021 | Baba | H01J 49/0077 |

OTHER PUBLICATIONS

International Search Report and Written Opinion, PCT/IB2021/056258, Dated Nov. 15, 2021, pp. 13.

Nordhoff E et al, "Mass Spectrometry of Nucleic Acids", Mass Spectrometry Reviews, John Wiley and Sons, New York, NY, US, (Mar. 1, 1996), vol. 15, No. 2, doi:10.1002/(SICI)1098-2787(1996)15:2<67::AID-MAS1>3.0.CO;2-8, ISSN 0277-7037, pp. 67-138, XP001120450.

Rautenbach Marina et al, "An Electrospray Ionization Mass Spectrometry Study on the "In Vacuo" Hetero-Oligomers Formed by the Antimicrobial Peptides, Surfactin and Gramicidin S", Journal of the American Society for Mass Spectrometry, Elsevier Science Inc, US, vol. 28, No. 8, doi:10.1007/S13361-017-1685-0, ISSN 1044-0305, (May 30, 2017), pp. 1623-1637, (May 30, 2017), XP036515230.

Wu J et al., "Ion/ion reactions of multiply charged nucleic acid anions: electron transfer, proton transfer, and ion attachment", International Journal of Mass Spectrometry, Elsevier Science Publishers , Amsterdam, NL, (Aug. 15, 2003), vol. 228, No. 2-3, doi:10.1016/S1387-3806(03)00165-9, ISSN 1387-3806, pp. 577-597, XP004442631.

* cited by examiner

CHARGE REDUCED MASS SPECTROMETRY FOR SEQUENCING OF OLIGONUCLEOTIDE THERAPEUTICS

RELATED APPLICATION

This application is a 35 U.S.C. 371 national stage filing of International Application No. PCT/IB2021/05658, filed on Jul. 12, 2021 which claims priority to U.S. provisional application no. 63/051,686 filed on Jul. 14, 2020, entitled "Charge Reduced Mass Spectrometry for Sequencing of Oligonucleotide Therapeutics," which is incorporated herein by reference in its entirety.

The present teachings are generally related to systems and methods for mass spectrometry, and more particularly to such systems and methods that can be employed for efficient sequencing and quantitation of oligonucleotides.

BACKGROUND

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Mass spectrometers detect chemical entities as ions such that a conversion of the analytes to charged ions must occur during the sampling process.

Oligonucleotides constitute one class of substances for which sequencing information is desired. In particular, oligonucleotide therapeutics are developing rapidly as medications for diseases related to recessive inheritance, such as Spinal Muscular Atrophy (SMA). To render the oligonucleotide therapeutics more stable and efficient, and to reduce their toxicity, the chemical structure of their backbone can be modified from the native ribose-phosphate structure. Mass spectrometry can be used as an efficient tool to sequence such oligonucleotide therapeutics with less sample consumption and even in the presence of chemical background contamination.

Negative electrospray ionization (ESI) can be used to produce highly charged states of oligonucleotides. For example, highly charged oligonucleotides with a charges of −7 to −9 are dominantly produced under various common LC-MS conditions. Collision induced dissociation (CID) is a conventional technique that is employed in tandem mass spectrometry for elucidating the composition and structure of molecules. The application of CID to highly charged oligonucleotides in a mixture of multiply charged product ions results, however, in the break-up of these molecules into small fragments, which renders sequencing difficult. Further, oligonucleotides having a lower charge can lead to low intensity in the resultant mass spectrum. In addition, the dependence of the charge-state distribution on the sequence of the molecule as well as the LC and MS conditions renders the quantitation difficult.

Accordingly, there is a need for enhanced systems and methods for mass spectrometric analysis of highly charged species, and in particular, highly charged oligonucleotides.

SUMMARY

A method of performing mass spectrometry is disclosed, which comprises ionizing a plurality of oligonucleotides to generate a plurality of negatively charged oligonucleotide ions, and interacting a plurality of positively charged reagent ions with the negatively charged oligonucleotide ions to reduce the negative charge state of the negatively charged oligonucleotide ions.

In some embodiments, each of the positively charged reagent ions comprises at least one protonated species that contributes one or more protons to at least one of the negatively charged oligonucleotide ions. In some embodiments, such transfer of protons can neutralize one or more phosphoric acid groups, thiophosphoric acid groups, or other suitable acid groups of the negatively charged oligonucleotide ions.

A variety of protonated species can be employed in the practice of the present teachings. By way of example, the protonated species can be a peptide, such as a cyclic peptide. Some examples of suitable protonated species include, without limitation, sex pheromone inhibitor iPD1 having the following amino-acid sequence: (Alanine—Leucine—Isoleucine—Leucine—Threonine—Leucine—Valine—Serine), and Gramicidins (cyclic peptides).

A variety of ion sources can be employed to generate the negatively charged oligonucleotides and the positively charged reagent ions. By way of example, a negative electrospray ion source (ESI) can be employed to generate the negatively charged oligonucleotides. In some embodiments, a positive ESI source can be employed to generate the positively charged reagent ions. In other embodiments, positively charged reagent ions are generated via electron impact ionization or chemical ionization.

In some embodiments, the negatively charged oligonucleotides and the positively charged reagent ions can be trapped concurrently, e.g., in an RF ion trap, to allow their interaction, which can lead to the transfer of protons from the positively charged reagent ions to the negatively charged oligonucleotide ions to reduce the negative charge state of the negatively charged oligonucleotide ions.

In some embodiments, the negative charge state of the negatively charged oligonucleotide ions can be, for example, in a range of about 2 to about 50. The interaction of the negatively charged oligonucleotide ions with the positively charged reagent ions can reduce the charge state associated with the negatively charged oligonucleotide ions.

In a related aspect, a mass spectrometer is disclosed, which comprises a branched radiofrequency (RF) ion trap comprising two sets of L-shaped rods positioned axially at a distance relative to one another so as to provide an axial section providing an inlet port for receiving ions and an outlet port through which the ions can exit the ion trap and two branched sections extending transversely from a central portion of said axial section and characterized by a transverse axis, wherein at least one of said transverse branched sections comprises an inlet port for receiving ions. The mass spectrometer further comprises a negative electrospray ion source for generating a plurality of negatively charged oligonucleotide ions, said negative electrospray ion source being coupled to said ion trap so as to introduce said negatively charged oligonucleotide ions into the ion trap via one of said axial or transverse inlet ports. A positive ion source is provided for generating a plurality of positively charged reagent ions to be introduced into said RF ion trap via one of said inlet ports different than the inlet port employed to introduce said negatively charged oligonucleotide ions into the ion trap such that said positively charged reagent ions interact with said negatively charged oligonucleotides in an interaction region of said ion trap so as to reduce a negative charge state thereof.

In some embodiments, the interaction region (i.e., a region in which the negatively charged oligonucleotide ions interact with the positively charged reagent ions) can be located at the central portion of the axial section of the branched RF ion trap.

In some embodiments, a first ion lens is disposed in the vicinity of the axial inlet port of the ion trap and a second ion lens is disposed in the vicinity of the transverse inlet port of the ion trap for focusing ions into the ion trap. Further, the mass spectrometer can include an electrode that is positioned proximate to an end of the transverse section of the RF ion trap opposite to the inlet port for inhibiting the exit of the ions from the RF ion trap along its transverse axis.

In some embodiments, mass selective extraction of ions from the ion trap can be employed to extract ions having desired m/z ratios (e.g. high m/z ions, such as ions having m/z ratios greater than 1500) from the ion trap. Such mass selective extraction can be achieved, for example, by application of an AC voltage to an electrode positioned in proximity of the outlet port of the ion trap.

In some embodiments, a mass filter is disposed downstream of the branched RF ion trap for providing mass selection of the oligonucleotide ions having a reduced negative charge state.

In some embodiments, a collision cell can be disposed downstream of the mass filter to cause fragmentation of at least a portion of the mass selected oligonucleotide ions into a plurality of oligonucleotide ion fragments.

A mass analyzer can be disposed downstream of the collision cell for providing mass analysis of the oligonucleotide ion fragments. By way of example, the mass analyzer can be a time-of-flight (TOF) mass analyzer, though other mass analyzers can also be employed.

In some embodiment, one or more ion guides can be disposed upstream of the branched RF ion trap to receive ions from an upstream ion source and to focus those ions into an ion beam for transmission into the branched RF ion trap.

A variety of oligonucleotides can be mass analyzed using the present teachings. For example, in some embodiments, the number of nucleotides in an oligonucleotide can be, without limitation, in a range of 2 to about 50. Some examples of oligonucleotides that can be analyzed using the present teachings include, without limitation, DNA fragments, morpholino oligonucleotides, among others.

Further understanding of various aspects of the present teachings can be obtained by reference to the following detailed description in conjunction with the associated drawings,

DETAILED DESCRIPTION

The present teachings are generally related to mass spectrometric methods and systems that can be utilized for mass spectrometric analysis of oligonucleotides. More specifically, in many embodiments, a plurality of negatively charged oligonucleotide ions are generated. The negatively charged oligonucleotide ions are then reacted with a positively charged reagent ion to reduce the negative charge state of the negatively charged oligonucleotide ions. As discussed in more detail below, in the following embodiments, the negatively charged oligonucleotide ions are reacted with the positively charged reagent ions in a branched radiofrequency (RF) ion trap. Mass selective extraction can be employed to extract ions having a reduced negative charge state and having desired m/z ratios (e.g., m/z ratios greater than a threshold) from the ion trap. The oligonucleotide ions with a reduced negative charge state can be subjected to fragmentation and a mass analysis of the oligonucleotide ion fragments can be obtained. The reduction in the negative charge state of the oligonucleotide ions can help reduce the complexity of a mass spectrum of the oligonucleotide ion fragments.

Figure 1:
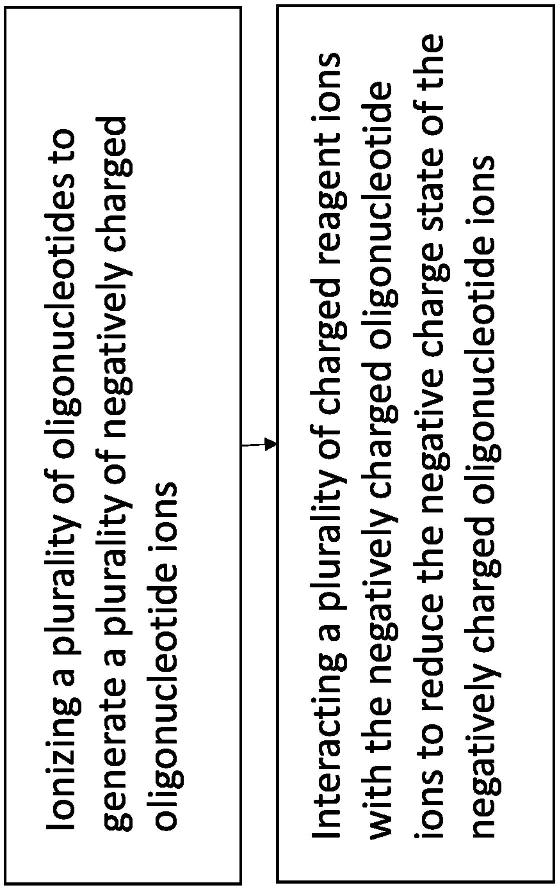
FIG. 1 is a flow chart depicting various steps in an embodiment of a method according to the present teachings, FIG. 2 schematically depicts transfer of a proton from a protonated reagent to a phosphate group, which is a desired outcome, and formation of a bond between a positively charged reagent and a phosphate group, which is not a desired outcome, FIG. 3 schematically depicts a mass spectrometer according to an embodiment which can be employed in the practice of the present teachings, FIG. 4 schematically depicts a mass spectrometer according to another embodiment which can be employed in the practice of the present teachings, FIGS. 5A and 5B schematically show the use of AC resonance excitation for m/z dependent extraction of ions from an ion reaction device according to an embodiment.

With reference to the flow chart of FIG. 1, in one embodiment, a method for performing mass spectrometry can include ionizing a plurality of oligonucleotides so as to generate a plurality of negatively charged oligonucleotide ions (step 1), and interacting a plurality of positively charged reagent ions with the negatively charged oligonucleotide ions to reduce the negative charge states of the negatively charged oligonucleotide ions (step 2).

A variety of oligonucleotides can be employed in the practice of the invention. By way of example, in some embodiments, the number of nucleotides in an oligonucleotide can be, for example, in a range of about 2 to about 50.

In some embodiments, the positively charged reagent ion can be a protonated species. In some such embodiments, the protonated species is a peptide. By way of example, it can be a cyclic peptide. Some examples of suitable protonated peptides that can be employed for reducing the negative charge state of the negatively charged oligonucleotides can be, for example, sex pheromone inhibitor iPD1 and Gramicidins.

Figure 2:
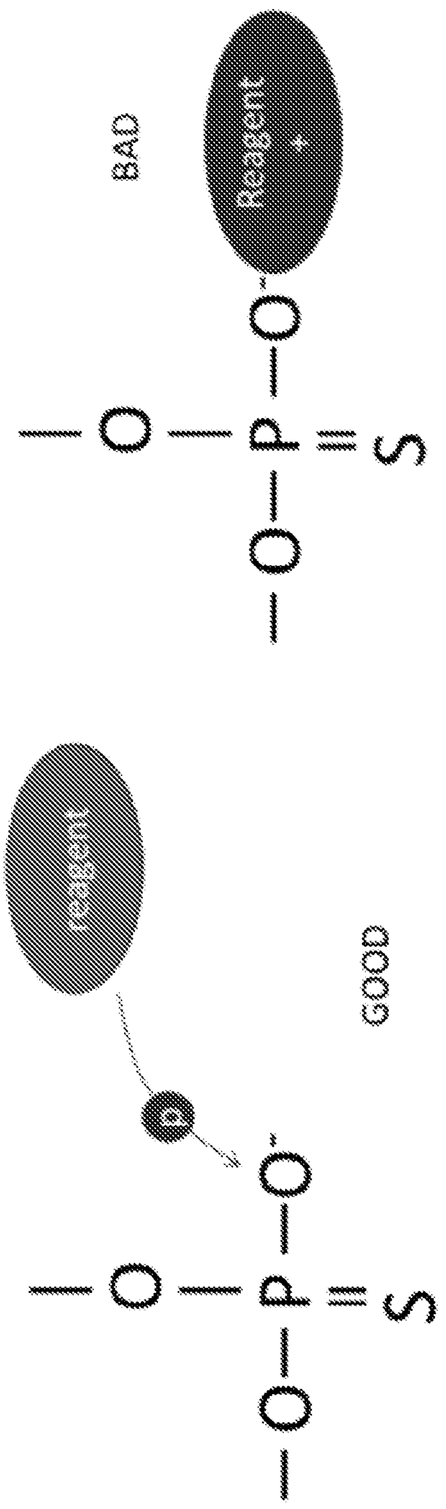

In general, the positively charged reagent ion is a protonated species that preferably exhibits a low proton affinity. As shown schematically in FIG. 2, such a protonated species can donate a proton to the negatively charged oligonucleotide, e.g., to neutralize one or more phosphate or thiophosphate groups of the negatively charged oligonucleotide. The use of such a protonated species can advantageously avoid the formation of a salt via reaction of the reagent with the negatively charged oligonucleotide.

Figure 3:
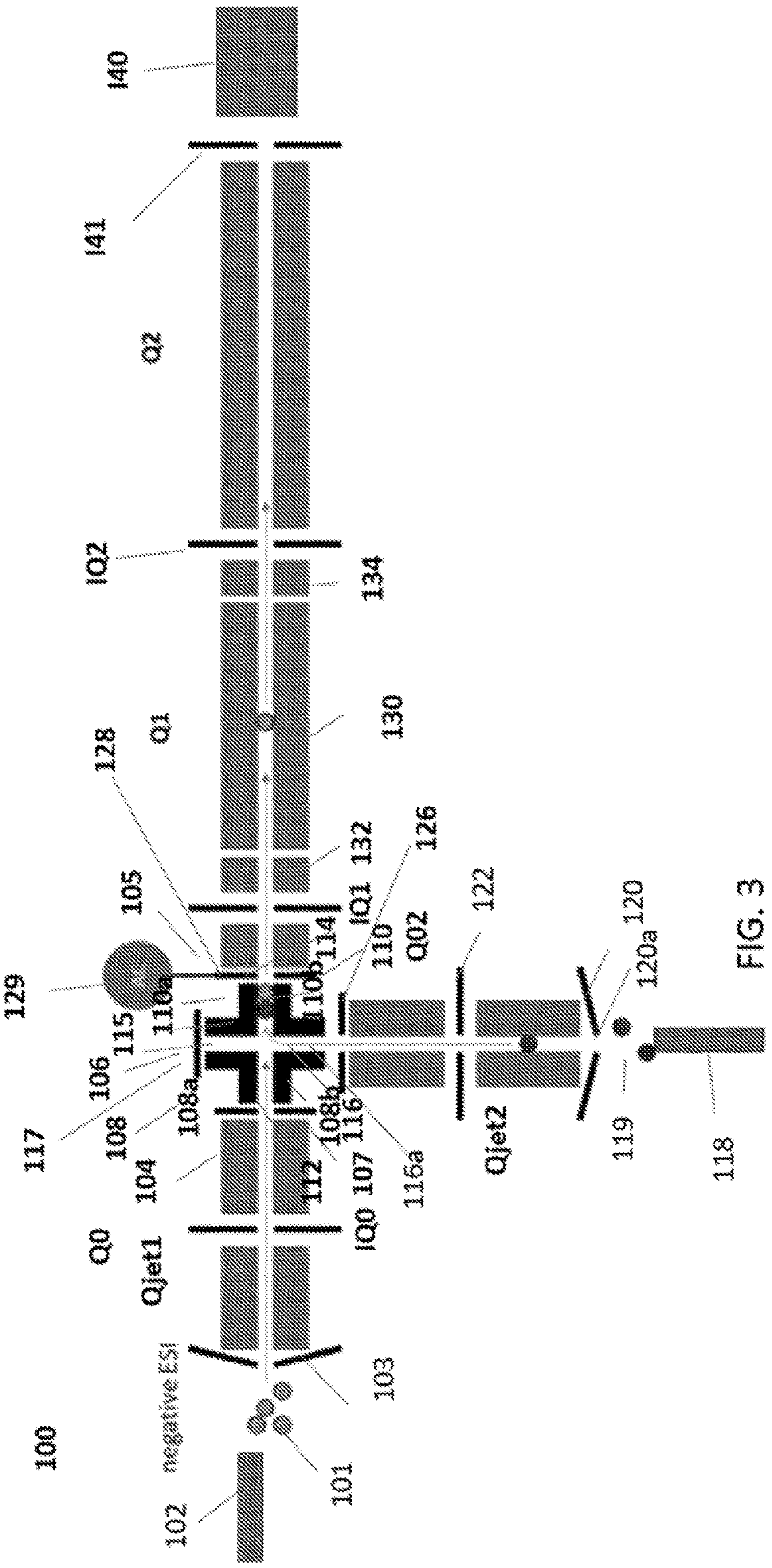

FIG. 3 schematically depicts a mass spectrometer 100 according to an embodiment, which includes a negative electrospray ion source 102 for generating a plurality of negatively charged oligonucleotides 101. The ion source 102 can be in communication with a sample holder (not shown in this figure) from which the ion source can receive the oligonucleotides. The negatively charged oligonucleotides pass through an opening of a curtain plate 103 of the mass spectrometer to enter an ion optic Qjet, which is disposed within an evacuated chamber.

In this embodiment, the ion optic Qjet comprises four rods that are arranged in a quadrupole configuration to form an ion beam for transmission to downstream components of the mass spectrometer. In use, the Qjet ion optic can be employed to capture and focus the ions received through the opening of the curtain plate 103 using a combination of gas dynamics and radio frequency fields. The ions pass through the Qjet region and are focused via an IQ0 lens into a Q0 region, which is disposed in an evacuated chamber.

In this embodiment, the Q0 region includes two Q0 ion guide sections 104 and 105 between which an ion reaction device 106 is positioned. In this embodiment, each Q0 ion guide section includes four rods that are arranged in a quadrupole configuration. The application of RF voltages to the rods of the Q0 ion guide sections can radially confine the ions in proximity of the central axes of these sections. The Q0 ion guide sections can focus the ions passing therethrough via a combination of gas dynamics and RF voltage (s) applied to their rods.

An ion lens 107 separates the Q0 ion guide section 104 from the ion reaction device 106 to interact with a plurality of positively charged reagent ions, as discussed in more detail below. In this embodiment, the reaction device 106 includes two sets of L-shaped electrodes 108 and 110 that are axially separated from one another to form an ion interaction region therebetween. Each set of L-shaped electrodes 108 and 110 includes four electrodes (only two electrodes of each set, namely, electrodes 108*a*/108*b* and 110*a*/110*b* are shown in the figure, the other two electrodes of each set are disposed behind the visible electrodes) that are arranged in a quadrupole configuration so as to provide a space therebetween through which the ions can pass.

The arrangement of the L-shaped electrodes results in an axial pathway that extends from an inlet port 112 through which ions can enter the reaction device to an exit port 114 through which the ions can exit the reaction device. Further, the arrangement of the L-shaped electrodes relative to one another provides two transverse branches 115/116.

The ion lens 107 focuses the ions into the ion reaction device 106. An electrode 117 positioned in proximity to a distal opening 115*a* of the transverse branch 115 can inhibit the leakage of ions from the reaction device via the transverse branch 115. More specifically, the application of a DC voltage to the electrode 117 can help trap ions within the reaction device. The other transverse branch 116 includes an opening 116*a* through which ions from another ion source can enter the reaction device, as discussed in more detail below.

More specifically, in this embodiment, the mass spectrometer 100 includes a positive electrospray ion source 118 for generating a plurality of positively charged reagent ions, which can interact with the negatively charged oligonucleotides to reduce the negative charge state of the oligonucleotides, as discussed in more detail below. The positive electrospray ion source 118 receives a plurality of reagent molecules from a reagent reservoir (not shown) and ionizes at least a portion of the reagent molecules to generate a plurality of positively charged reagent ions 119. By way of example, the positively charged reagent ions can be protonated species that can donate protons to the negatively charged oligonucleotide ions to reduce their negative charge state. As noted above, in some embodiments, such positively charged reagent ions can be protonated peptides, such as protonated cyclic peptides.

While in this embodiment a positive electrospray ion source is employed, in other embodiments other ion sources for generating a plurality of positively charged reagent ions can be employed. Some examples of such ion sources include, without limitation, an electron impact ionization source, and a chemical ionization source.

As discussed in more detail below, the positively charged reagent ions can be received by an opening of a curtain plate 120 and guided by a Qjet ion optic (herein referred to as Qjet2) and a Q0 ion guide (herein referred to as Q02), which are coupled to the transverse branch 116, to the transverse inlet 116*a* through which the ions can enter the reaction device. More specifically, the positively charged reagent ions can enter the Qjet2 ion optic via an orifice 120*a* of a curtain plate 120. Similar to the Qjet1 ion optic, the Qjet2 ion optic comprises four rods that are arranged in a quadrupole configuration to form an ion beam. More specifically, the Qjet2 ion optic can be employed to capture and focus the positively charged reagent ions received via the orifice 120*a* of the curtain plate 120 using a combination of gas dynamics and radio frequency fields.

An IQ0 lens 122 separates the Qjet2 ion optic from the Q02 ion guide, which includes four rods arranged in a quadrupole configuration. The application of RF voltages to the rods of the Q02 ion guide can radially confine the ions in proximity of the central axis of the Q02 ion guide. More specifically, the Q02 ion guide can focus the ions passing therethrough via a combination of gas dynamics and RF voltage applied to its rods.

The positively charged ions exiting the Q02 ion guide are focused by an ion lens 126 into the ion reaction device 106 to interact with the negatively charged oligonucleotides at the center of the ion reaction device 106. The interaction of the positively charged reagent ions with the negatively charged oligonucleotides can result in transfer of protons from the positively charged reagent ions to the negatively charged oligonucleotides, thereby reducing the negative charge state of the negatively charged oligonucleotides. By way of example, in some embodiments the interaction of the positively charged reagent ions with the negatively charged oligonucleotides by a value, e.g., in a range of 1 to about 3, though other charge reductions values may also be observed.

An electrode 128 is positioned in proximity of the exit port 114 of the ion reaction device. An AC voltage applied to the electrode 128 via an AC source 129 can provide a pseudopotential voltage barrier to help confine the positively charged reagent ions and the negatively charged oligonucleotides simultaneously within the ion reaction device. This allows the negatively charged oligonucleotides to continue to react with the positively charged reagent ions so as to reduce the negative charge state of the negatively charged oligonucleotide ions (via proton transfer from the positively charged reagent ions).

Figure 5A:
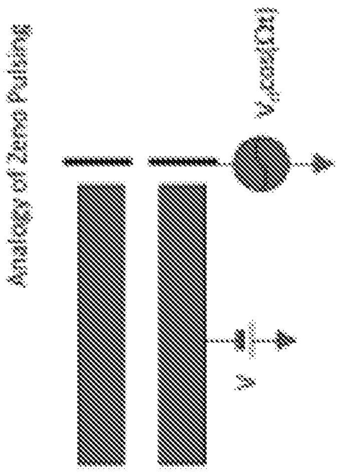
Figure 5B:
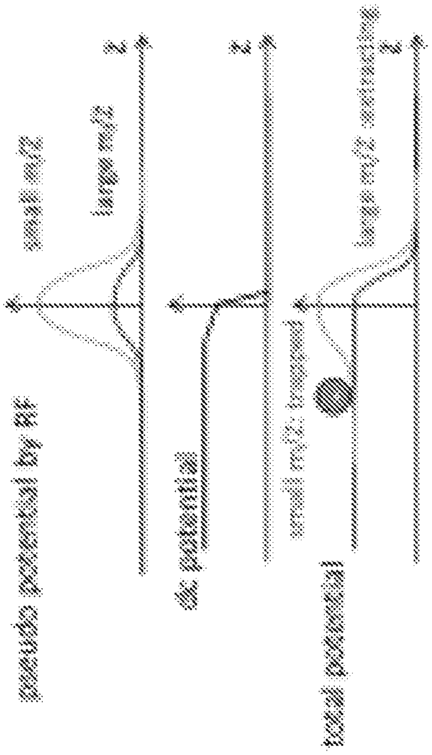

Further, with reference to FIGS. 5A and 5B, the AC voltage can be controlled to provide AC excitation in order to obtain high pass m/z dependent extraction of the ions from the ion reaction device. In particular, with reference to FIG. 5B, a combination of the AC voltage applied to the electrode 128 and a DC voltage applied to distal set of rods of the ion reaction device generates a pseudo potential that provides a larger barrier for small m/z ions and a lower barrier for the large m/z ions.

In this manner, the negatively charged oligonucleotide ions having a reduced negative charge can be extracted from the ion reaction device and introduced into the Q1 region of the mass spectrometer, which is separated from the Q0 region via an ion lens IQ1. For example, when the charge state is reached to −3, ions are extracted from the charge reduction device, e.g., via mass-dependent extraction. As discussed in more detail below, the extracted ions are isolated by a mass filter, and dissociated via collision-induced-dissociation. The product ions can be mass analyzed by a downstream mass analyzer, e.g., a TOF mass analyzer.

In this embodiment, the Q1 region includes a Q1 mass filter 130, which includes four rods arranged in a quadrupole configuration and two stubby lenses 132 and 134 that focus ions exiting the ion reaction device into the Q1 mass filter 130 and focus the ions exiting the Q1 mass filter into a downstream collision cell, as discussed in more detail below.

More specifically, a collision cell Q2 is positioned downstream of the mass filter Q1 and is separated from the mass filter Q1 via an ion lens IQ2. The negatively charged oligonucleotides entering Q2 can undergo fragmentation via collision-induced dissociation to generate a plurality of oligonucleotide fragment ions. In some embodiments, such collision-induced dissociation can occur via collision of the negatively charged oligonucleotide ions with neutral gas molecules, e.g., helium, nitrogen or argon, present in the Q2 region.

A mass analyzer 140, e.g., a time-of-flight (TOF) mass analyzer in this embodiment, is positioned downstream of the Q2 region to provide mass analysis of the oligonucleotide fragment ions. In other embodiments, a mass analyzer other that a TOF mass analyzer can be employed.

Figure 4:
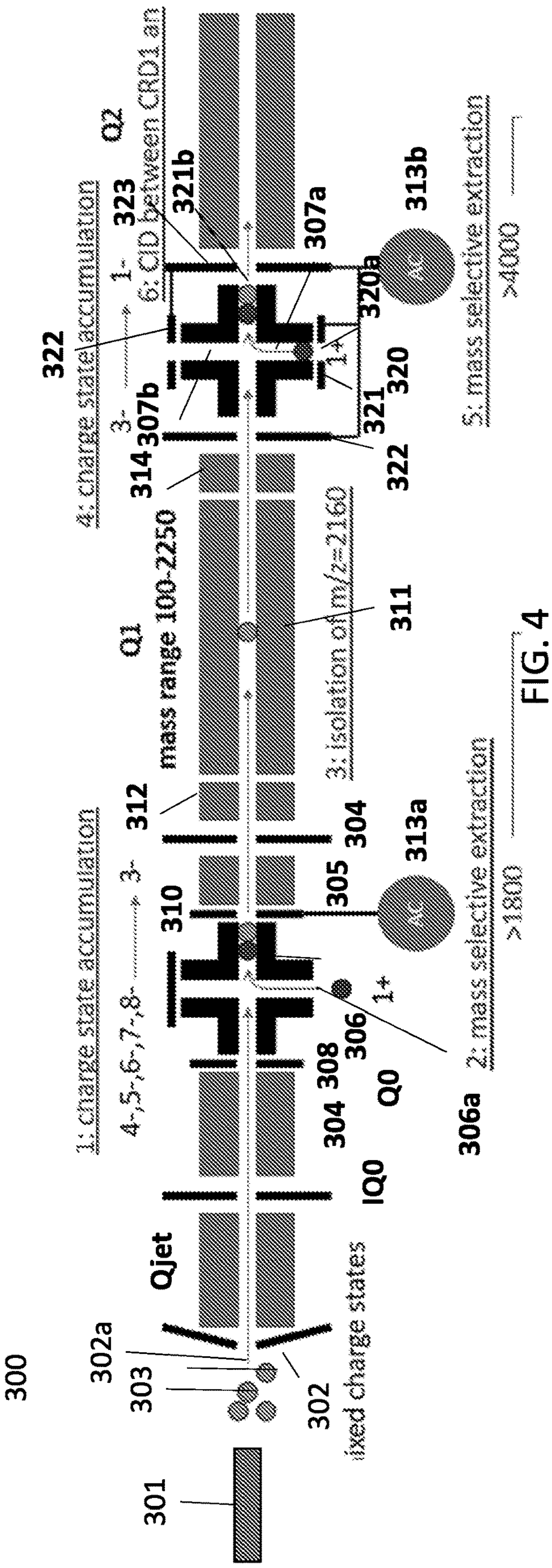

FIG. 4 schematically depicts a mass spectrometer 300 according to another embodiment, which achieves a reduction in the negative charge state of negatively charged oligonucleotides in two stages. More specifically, as discussed below, the mass spectrometer 300 includes two ion reaction devices that are employed to reduce the negative charge of the negatively charged oligonucleotides in two stages.

The mass spectrometer 300 includes a negative electrospray ion source 301 for generating a plurality of negatively charged oligonucleotide ions 303. The negatively charged oligonucleotide ions can enter the mass spectrometer through an orifice 302*a* of a curtain plate 302. Similar to the previous embodiment, the mass spectrometer 300 includes a Qjet ion optic that is separated from a Q0 region of the mass spectrometer by an ion lens IQ0. As noted above, the Qjet ion optic focuses the ions via a combination of gas dynamics and RF fields.

Similar to the previous embodiment, the Q0 region includes two Q0 ion guide sections 304 and 305 between which an ion reaction device 306 is positioned. In this embodiment, each ion guide section 304/305 includes four rods that are arranged in a quadrupole configuration so as to allow passage of ions therebetween. The application of RF voltages to the rods can provide radial confinement of the ions as they pass through the ion guide sections 304/305.

The ion reaction device 306 has the same structure as the ion reaction device 104 discussed above and is formed by two sets of L-shaped rods (each set including four rods) that are axially separated from one another to form an ion interaction region therebetween. An ion lens 308 disposed in proximity of the inlet port of the ion reaction device 306 separates the ion reaction device 306 from the ion guide section 304 and focuses the ions exiting the ion guide section 304 into the ion reaction device 306. Further, an ion lens 310 disposed in proximity of the exit port of the ion reaction device separates the ion reaction device 306 from the ion guide section 305. Similar to the previous embodiment, the application of an AC voltage by an AC source 313 to the ion lens 310 can help confine the ions within the ion reaction device 306 or provide mass dependent extraction of the ions from the ion reaction device for introduction into a downstream Q1 region that is separated from the Q0 region by an ion lens IQ1.

The Q1 region includes a Q1 mass filter 311, which is formed by four rods arranged in a quadrupole configuration, and two stubby lenses 312 and 314 that help focus ions into the mass filter and focus the mass-selected ions exiting the mass filter into another downstream ion reaction device 320, as discussed in more detail below.

Though not shown in this figure, similar to the previous embodiment, the ion reaction device 306 includes two transverse branches 307*a*/307*b* and is configured to receive positively charged reagent ions via a transverse inlet 306*a* thereof from a positive ion source, such as the ion source 118 discussed above in connection with the previous embodiment. Further, similar to the previous embodiment, a Qjet ion optic and a Q0 ion guide (not shown in this figure) can be disposed between the positive ion source and the transverse inlet 306*a* to focus and guide the positive ions into the ion reaction device 306 so that the positively-charged ions can interact with the negatively-charged oligonucleotides to reduce the negative charge state thereof.

The second ion reaction device 320 receives the ions selected by the Q1 321 filter via an ion lens 322. The application of an AC voltage via an AC voltage source 313*b* to the ion lens 322 allows mass-dependent extraction of ions from the Q1 mass filter 311 into the second ion reaction device 320. The ion reaction device 320 has the same structure as the ion reaction device 306 and receives a plurality of positively charged ions via a transverse inlet 320*a* thereof in a manner discussed above. The mass selected negatively-charged ions received from the Q1 region undergo another charge reduction by interacting with a plurality of positively-charged reagent ions within an interaction region of the ion reaction device 320.

Similar to the ion reaction device 306, the application of an AC voltage to an ion lens 323 disposed in proximity of the outlet port 320*b*, via the AC voltage source 313*b*, can help confine the ions within the ion reaction device 306 so as to allow their interaction and can also be adjusted to allow mass-dependent extraction of the ions with reduced charge state from the ion reaction device 320.

The extracted ions can enter a collision cell Q2 to undergo collision induced fragmentation. In this embodiment, the Q2 collision cell includes four rods arranged in a quadrupole configuration to which RF voltages can be applied for radial confinement of the ions within the collision cell and can contain a neutral gas, such as, nitrogen, helium or argon, with which the received ions can collide and undergo fragmentation.

A mass analyzer (not shown in this figure) positioned downstream of the Q2 collision cell can receive the oligonucleotide fragment ions and provide mass analysis thereof. By way of example, the mass analyzer can be a time-of-flight (TOF) mass analyzer.

The following examples are provided for further elucidation of various aspects of the present teachings. These examples are provided only for illustrative purposes and are not intended to indicate necessarily the optimal ways of practicing the present teachings or optimal results that may be obtained.

EXAMPLES

Example 1

A mass spectrometer similar to the mass spectrometer 100 discussed above was employed to perform mass spectrometry on a sample containing dT15 oligonucleotides in mixed charge states. The oligonucleotides were trapped within the ion reaction device 106 and allowed to interact with electron ionized residual gas, which resulted in a reduction in the negative charge state of the negatively charged oligonucleotides. A mass selective extraction was employed, in a manner discussed above, to extract ions having an m/z greater than 1800.

Figure 6:
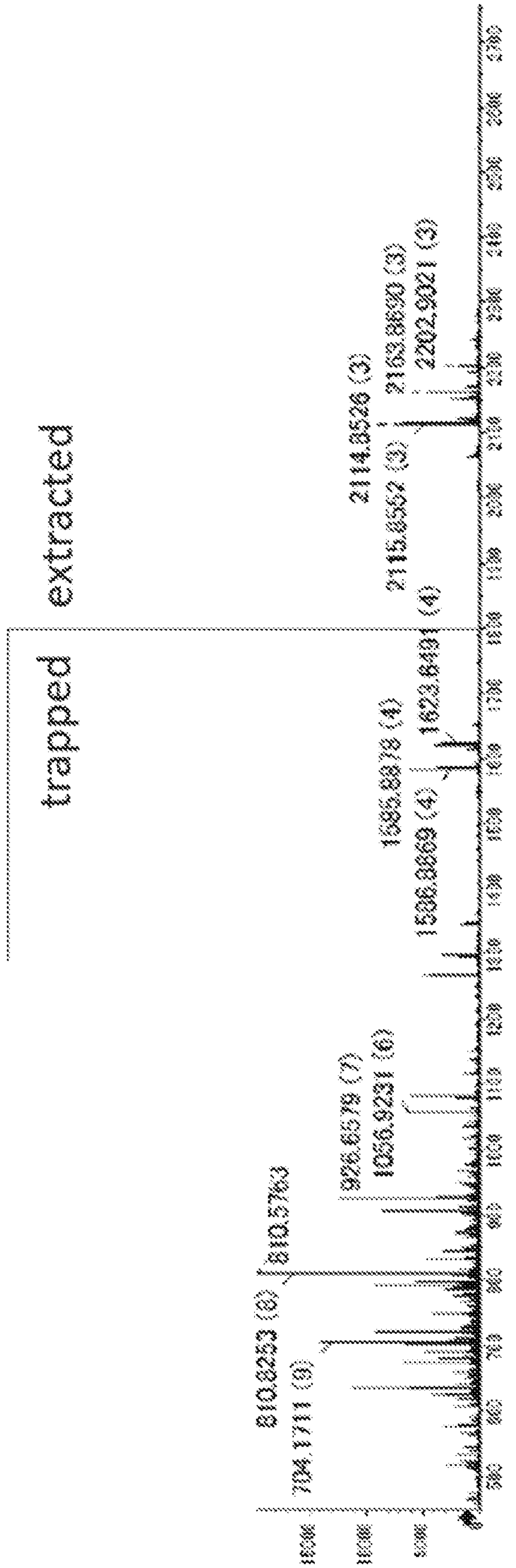
FIG. 6 shows a mass spectrum of a plurality of negatively-charged oligonucleotides trapped in an ion reaction device according to an embodiment of the present teachings as well as a mass spectrum of those oligonucleotides with an m/z greater than 1800 and with a reduced charge state, due to interaction with a positively charged reagent in the ion reaction device.

In particular, FIG. 6 shows mass spectra of the trapped oligonucleotides as well as a mass spectrum of the oligonucleotides with a reduced charge state with an m/z greater than 1800. The mass spectrum of the trapped oligonucleotides indicates that the charged species listed in Table 1 below were present in the oligonucleotide sample:

TABLE 1

| Z | m/z |
|---|---|
| 8− | 810 |
| 7− | 926 |
| 6− | 1080 |
| 5− | 1296 |
| 4− | 1620 |
| 3− | 2160 |
| 2− | 3240 |
| 1− | 6480 |

Example 2

A mass spectrometer similar to the mass spectrometer 300 described above (See, FIG. 4) was employed to perform mass spectrometry on a sample containing dT15 oligonucleotides. As noted above, this mass spectrometer includes two ion reaction devices that provide consecutive charge reduction of the negatively charged oligonucleotides.

The sample containing the oligonucleotides was ionized to generate a plurality of negatively-charged oligonucleotides in mixed charge states. The negatively charged oligonucleotides were trapped in the first ion reaction device 306. The mass spectrum of the trapped oligonucleotides, shown in FIG. 7, indicates that the charged species listed in Table 1 above were present in the oligonucleotide sample.

The trapped oligonucleotides were allowed to interact with a plurality of positively-charged electron-ionized vacuum residual gas ions, thereby reducing their negative charge state. Mass dependent extraction was employed to extract ions having an m/z greater than 1800 from the first ion reaction device. The extracted ions exhibited an m/z in a range of 100-2250.

The ions extracted from the first ion reaction device were introduced into a downstream mass filter Q1, which was employed to isolate ions with an m/z of 2160. The isolated ions were then transmitted into a second ion reaction device and were trapped therein. The ions trapped within the second ion reaction device interacted with the positively-charged electron-ionized vacuum residual gas ions, which resulted in further reduction of the charge state of isolated oligonucleotides to a negative charge state of 1. This was followed by a mass-dependent extraction of ions having a mass greater than 4000 from the second ion reaction device.

Figure 7:
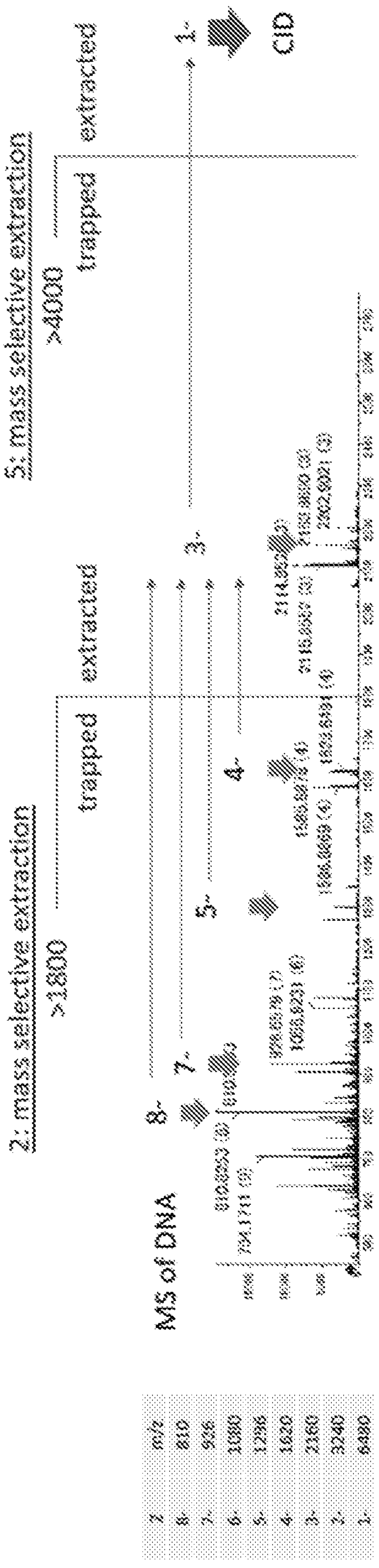
FIG. 7 shows a spectra depicting charge state reductions in accordance with an embodiment of the present teachings.

The extracted ions were introduced into a collision cell Q2 to undergo fragmentation via collision-induced dissociation. The fragmented ions were then mass analyzed using a downstream mass analyzer, e.g., a time-of-flight (TOF) mass analyzer in a manner described above. FIG. 7 depicts the sequence of charge state reductions.

One advantage of utilizing two consecutive ion reaction devices is to provide additional reduction in the negative charge state of the negatively-charged oligonucleotides.

Those having ordinary skill in the art will appreciate that various changes can be made to the above embodiments without departing from the scope of the invention.

What is claimed is:

1. A method of performing mass spectrometry, comprising:
- ionizing a plurality of oligonucleotides to generate a plurality of negatively charged oligonucleotide ions, and
- interacting a plurality of positively charged reagent ions with said negatively charged oligonucleotide ions to reduce the negative charge states of said negatively charged oligonucleotide ions.

2. The method of claim 1, wherein each of said positively charged reagent ions comprises at least one protonated species that contributes a proton to one of said negatively charged oligonucleotide ions.

3. The method of claim 2, wherein said at least one protonated species is a protonated peptide.

4. The method of claim 3, wherein said protonated peptide is a cyclic peptide.

5. The method of claim 3, wherein said protonated peptide comprises any of sex pheromone iPD1, Gramicidins.

6. The method of claim 1, further comprising using a negative ESI source to generate said negatively charged oligonucleotides and a positive ESI source to generate said positively charged reagent ions.

7. The method of claim 1, wherein each of said negatively charged oligonucleotide ions has a negative charge state in a range of about 2 to about 50.

8. The method of claim 1, wherein said oligonucleotides have a number of nucleotides in a range of 2 to about 50.

9. The method of claim 1, wherein each of said charged reagent ions neutralizes any of a phosphoric acid group and thiophosphoric acid of one of said negatively charged oligonucleotide ions.

10. The method of claim 1, wherein said positively charged reagent ions are generated via electron impact ionization.

11. The method of claim 1, wherein said positively charged reagent ions are generated via chemical ionization.

12. The method of claim 1, further comprising concurrently trapping said negatively charged oligonucleotide ions and said positively charged reagent ions.

13. A mass spectrometer, comprising:
- a branched radiofrequency (RF) ion trap comprising two sets of L-shaped rods positioned axially at a distance relative to one another so as to provide an axial section providing an inlet port for receiving ions and an outlet port through which the ions can exit the ion trap and two branched sections extending transversely from a central portion of said axial section and characterized by a transverse axis, wherein at least one of said transverse branched sections comprises an inlet port for receiving ions, a negative electrospray ion source for generating a plurality of negatively charged oligonucleotide ions, said negative electrospray ion source being coupled to said ion trap so as to introduce said negatively charged oligonucleotide ions into the ion trap via one of said axial or transverse inlet ports, a positive ion source for generating a plurality of positively charged reagent ions to be introduced into said RF ion trap via one of said inlet ports different than the inlet port employed to introduce said negatively charged oligonucleotide ions into the ion trap such that said positively charged reagent ions interact with said negatively charged oligonucleotides in an interaction region of said ion trap so as to reduce a negative charge state thereof.

14. The mass spectrometer of claim 13, wherein said interaction region comprises said central portion of said axial section.

15. The mass spectrometer of claim 13, further comprising a first ion lens disposed in vicinity of said axial inlet port of the ion trap and a second ion lens disposed in vicinity of said transverse inlet port of the ion trap for focusing the ions into the ion trap.

16. The mass spectrometer of claim 13, further comprising an electrode positioned proximate to an end of the transverse section opposite to said inlet port for inhibiting the exit of the ions along said transverse axis.

17. The mass spectrometer of claim 13, wherein said positive ion source comprises a positive electrospray ion source.

18. The mass spectrometer of claim 13, wherein said positive ion source comprises an electron impact ionization source.

19. The mass spectrometer of claim 13, wherein said positive ion source comprises a chemical ionization source.

20. The mass spectrometer of claim 13, further comprising a mass filter disposed downstream of said branched RF ion trap for provide mass selection of said oligonucleotide ions having a reduced charge state.

* * * * *